United States Patent
Hayaishi et al.

(10) Patent No.: US 10,899,005 B2
(45) Date of Patent: Jan. 26, 2021

(54) LINK-SEQUENCE MAPPING DEVICE, LINK-SEQUENCE MAPPING METHOD, AND PROGRAM

(71) Applicants: Naohiro Hayaishi, Hyogo (JP); Kazuma Takahara, Hyogo (JP)

(72) Inventors: Naohiro Hayaishi, Hyogo (JP); Kazuma Takahara, Hyogo (JP)

(73) Assignee: Keisuu Giken Co., Ltd., Osaka (JP)

( * ) Notice: Subject to any disclaimer, the term of this patent is extended or adjusted under 35 U.S.C. 154(b) by 268 days.

(21) Appl. No.: 15/776,228

(22) PCT Filed: Nov. 16, 2016

(86) PCT No.: PCT/JP2016/084017
§ 371 (c)(1),
(2) Date: May 15, 2018

(87) PCT Pub. No.: WO2017/086364
PCT Pub. Date: May 26, 2017

(65) Prior Publication Data
US 2020/0180156 A1 Jun. 11, 2020

(30) Foreign Application Priority Data

Nov. 16, 2015 (JP) ................................. 2015-223641

(51) Int. Cl.
*B25J 9/16* (2006.01)
*G05D 1/02* (2020.01)

(52) U.S. Cl.
CPC .......... *B25J 9/1666* (2013.01); *G05D 1/0238* (2013.01)

(58) Field of Classification Search
CPC .............................. B25J 9/1666; G05D 1/0238
See application file for complete search history.

(56) References Cited

U.S. PATENT DOCUMENTS 9,321,176 B1 * 4/2016 Sun ..................... B25J 9/1656
2005/0149227 A1 * 7/2005 Peters, II ............. G05D 1/0274
700/245

(Continued)

FOREIGN PATENT DOCUMENTS

JP 2004-227276 A 8/2004
JP 2006-088276 A 4/2006

(Continued)

OTHER PUBLICATIONS

International Search Report (English translation), WO 2017086364 (PCT/JP2016/084017), dated Jan. 10, 2017, 2 pages.

*Primary Examiner* — Kira Nguyen
(74) *Attorney, Agent, or Firm* — Ogilvie Law Firm

(57) ABSTRACT

Provided is a link-sequence mapping device capable of automatically mapping a model link-sequence to a link sequence of an arbitrarily defined robot. The link-sequence mapping device (1) is equipped with: a reception unit (11) for receiving model link-sequence information indicating the positions of respective links included in a model link-sequence; an identification unit (14) for identifying, by using the model link-sequence information, coordinate values of predetermined multiple positions in the model link-sequence; a calculation unit (15) for calculating robot link-sequence information, that is, information about the positions of respective links included in a robot link-sequence, such that objective functions corresponding to the respective distances between the identified multiple positions and corresponding multiple positions in the robot link-sequence are reduced; and an output unit (17) for outputting information about angles of respective joints in the robot link-sequence which are determined in accordance with the calculated robot link-sequence information.

20 Claims, 9 Drawing Sheets

(56) References Cited

U.S. PATENT DOCUMENTS

| | | | | |
|---|---|---|---|---|
| 2007/0156283 | A1* | 7/2007 | Takenaka | B62D 57/032 |
| | | | | 700/245 |
| 2008/0188986 | A1* | 8/2008 | Hoppe | B25J 9/1692 |
| | | | | 700/263 |
| 2009/0254236 | A1* | 10/2009 | Peters, II | G05D 1/0246 |
| | | | | 701/28 |
| 2010/0057255 | A1 | 3/2010 | Ra et al. | |
| 2011/0082586 | A1* | 4/2011 | Nishihara | B25J 9/1697 |
| | | | | 700/259 |

FOREIGN PATENT DOCUMENTS

| | | |
|---|---|---|
| JP | 2006-198709 A | 8/2006 |
| JP | 2007-315968 A | 12/2007 |
| JP | 2010-058260 A | 3/2010 |

* cited by examiner

Fig.7
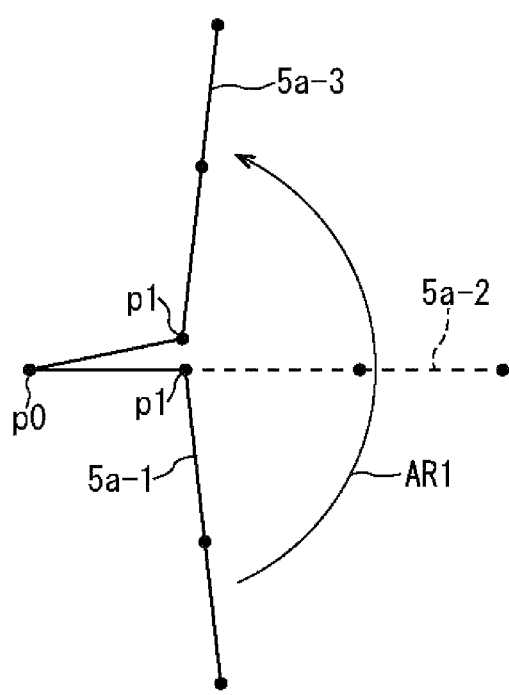
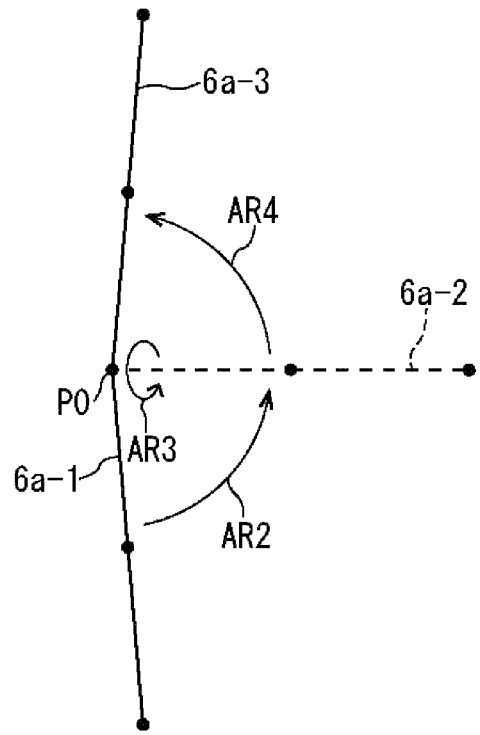
Model    Robot

LINK-SEQUENCE MAPPING DEVICE, LINK-SEQUENCE MAPPING METHOD, AND PROGRAM

TECHNICAL FIELD

The present invention relates to a link-sequence mapping device or equipment and so on employed to perform mapping of a model link-sequence on a robot link-sequence.

BACKGROUND ART

Conventionally, humanoid robots have been manufactured and also making the humanoid robots imitate the action (movement) of a human being is conducted. With regard to the humanoid robots that can perform movements similar to those of a human being, the captured movement of a human being can be operated as it is. On the other hand, if it is not the case, for example, a humanoid robot has smaller number of joints than a human being, or the movable region of a joint is narrower than that of a human being, it was necessary to convert the captured movement of the human being so that the movement of the human being matches the movement of the humanoid robot. The setting of such a conversion was manually performed by human beings.

Note that as a technology related to this theme, a technology that captures human movement is known. (For example, refer to the patent literature 1)

PRIOR ART

Patent Literature

[Patent literature 1] JPT2012-525643

OUTLINE OF THE INVENTION

Problems to be Solved by the Invention

As described above, there has been a problem that, when converting the captured motion of a human being so as to conform to the motion of a robot, it has been necessary to set the conversion for each type of the humanoid robot. Also, even if such conversion settings are made, there has been a problem that the movement of a humanoid robot is stopped due to the fact that, for example, the movement of the human being cannot be converted in an appropriate way when a human being moves in an unexpected way.

Generally speaking, there has been a request to make it unnecessary to manually create the conversion formula or the like when the model motion is mapped to the robot.

The present invention has been made in view of the circumstances described above, and it is an object of the present invention to provide a link-sequence mapping device or the like capable of automatically mapping a model link-sequence to a link-sequence of an arbitrary robot.

Means to Solve the Objects

To achieve the object described above, a link-sequence mapping device of the present invention includes: an receiving unit that receives model link-sequence information that is information on the position of each link included in a model link-sequence; a specifying unit for specifying coordinate values of a plurality of predetermined points in a model link-sequence by using model link-sequence information received by the receiving unit: a calculation unit for calculating the robot link-sequence information which regards to the position of each link included in the robot link-sequence to make the objective function corresponding to the distance between the plurality of positions specified by the specifying unit and the plurality of positions in the robot link-sequence small, each corresponding to the plurality of positions and an output unit for outputting the information regarding the angle of each joint of link-sequence of a robot corresponding to the robot link-sequence information calculated by the calculation unit.

With such a configuration, even if there is a difference, for example, in the number of links or the like between the model link-sequence and the robot link-sequence, the information regarding the angle of each joint of the robot link-sequence can be output so that the robot link-sequence comes to resemble the model link-sequence. As a result, it becomes unnecessary to manually create a conversion formula or the like for mapping the model link-sequence to the link-sequence of an arbitrary robot automatically. In addition, since conversion formulas or the like are not used, the robot link-sequence information can be calculated even if the position of the model link-sequence becomes unexpected one, because conversion formulas or the like are not used. Therefore, it becomes possible, for example, to avoid such a situation that the movement of the robot link-sequence stops.

Also in the link-sequence mapping device of the present invention, the number of the plurality of positions may be greater than that of the connection points in the robot link-sequence.

With such a configuration, it becomes possible to appropriately map the model link-sequence to the robot link-sequence.

Furthermore, in the link-sequence mapping device of the present invention, the apparatus further comprises a storage unit that stores joint movable range information indicating the range of motion of the joint in the robot link-sequence, and the calculation unit may calculate, in the region, the robot link-sequence information so that the objective function becomes small, within the joint movable region indicated by the joint movable region information.

With such a configuration, for example, even if the range of motion of the joint is different between that of the model link-sequence and that of the robot link-sequence, the robot link-sequence information can be calculated so that the robot link-sequence resembles the model link-sequence.

Further, in the link-sequence mapping device of the present invention, a normalizing unit for normalizing the length of the model link-sequence and the length of the robot link-sequence may be further disposed and the distance may be the distance after the normalization.

With such a configuration, it becomes possible to appropriately map the model link-sequence to the robot link-sequence.

Also, in the link-sequence mapping device of the present invention, the distance may be a distance corresponding to the coordinate value in the coordinate system with the base end of the model link-sequence and the base end of the robot link-sequence as the origins.

By such a configuration, it is possible to reduce the calculation amount when calculating the robot link-sequence information.

Further, in the link-sequence mapping device of the present invention, a noise elimination unit for eliminating a high-frequency noise component included in the robot link-sequence information may be further disposed and the output unit may output the information on the angle of each joint of the robot link-sequence according to robot link-sequence information with the high frequency noise component eliminated by the noise elimination unit.

With such a configuration, it becomes possible to perform output with the noise eliminated, for example, even when high-frequency noises are contained in the model link-sequence information.

Effects of the Invention

According to the link-sequence mapping device and the like of the present invention, it becomes possible to automatically map the model link-sequence to the arbitrary link-sequence of the robot. As a result, it becomes unnecessary to manually generate conversion formulas and such for mapping. In addition, even when the model performs an unexpected operation, it becomes possible to calculate the robot link-sequence information.

BRIEF DESCRIPTION OF THE DRAWINGS

FIG. 7 is a diagram showing an example of an operation of a model and a robot link-sequence in the same embodiment.

BEST MODE FOR CARRYING OUT THE INVENTION

Figure 1:
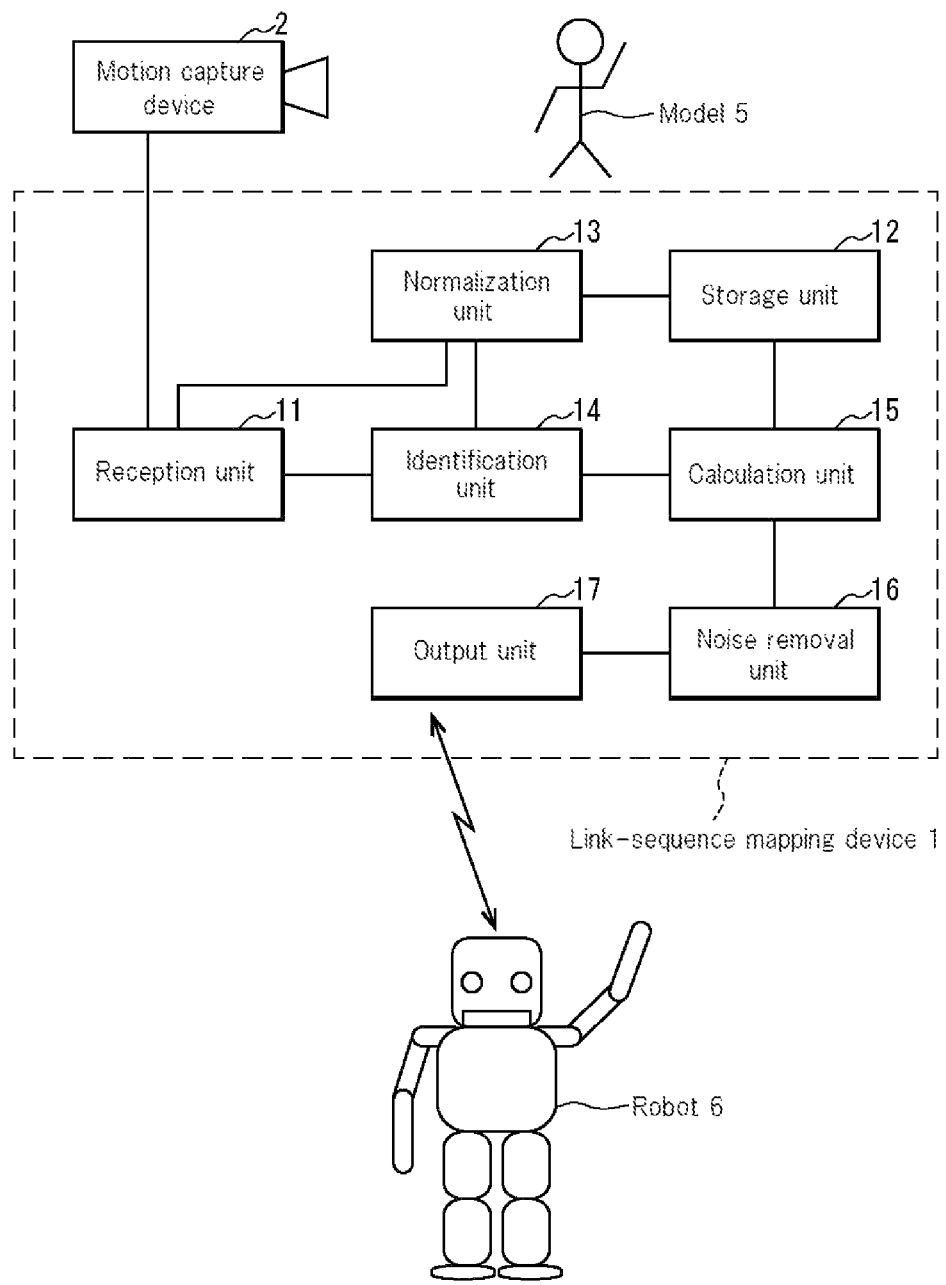
FIG. 1 is a block diagram showing a configuration of a link-sequence mapping device in the present embodiment.

Hereinafter, the link-sequence mapping device of the present invention is explained using embodiments. In the following embodiments, constituent elements and steps affixed with the same reference numerals are the same or equivalent, and redundant explanation may be omitted. In the link-sequence mapping device according to the present embodiment, in order to map the model link-sequence to the robot link-sequence, the angle of each joint of the robot link-sequence is determined in a way thereby the objective function corresponding to each distance between a plurality of points on the model link-sequence and a plurality of points on the robot link-sequence becomes small.

FIG. 1 is a block diagram showing a configuration of a link-sequence mapping device 1 according the present embodiment. The link-sequence mapping device 1 according to the present embodiment includes a reception unit 11, a storage unit 12, a normalization unit 13, a specification unit 14, a calculation unit 15, a noise removal unit 16 and an output unit 17.

The reception unit 11 receives model link-sequence information that is information on the position of each link included in the model link-sequence 5. The model 5 may be, for example, a human being, an animal other than a human being, a robot or the like. Note that the link-sequence mapping device 1 is to perform mapping in order to make the robot 6 mimics the movement of the model 5 and the model 5 suitably has motion, accordingly. This model 5 is an object to be a mapping source of mapping of a link-sequence. It is preferable that the model 5 has one or more link-sequences to be mapped. For example, when the model 5 is a human, each of the limbs becomes a link-sequence. Also, from a head to a waist of a human being may be regarded as one link-sequence. The model link-sequence information may be information of the whole of a plurality of connected links (for example, a link-sequence from the center of both shoulders to a hand or the like, etc.) and a part of the connected plurality of links. (for example, a link-sequence from an elbow to a hand, etc.) Furthermore, the model link-sequence information may be a link-sequence information having an end portion such as a hand or a toe, or may be a link-sequence information from a joint to a wrist. Furthermore, in the present embodiment, a case wherein the model link-sequence information is a link-sequence information not including a branch is mainly described, but the model link-sequence information may be a link-sequence information including a branch. The model link-sequence information may be any information as long as it is information that can indicate the position of each link included in the model link-sequence 5, as a result. The model link-sequence information, for example, may be information indicating the positions of both ends of each link, or may be information indicating the length of each link and the angle between links in a joint. The information indicating the positions of both ends of each link may include information indicating the position of each joint or may include information indicating the position of the end portion of the link-sequence. In the present embodiment, a case wherein the model link-sequence information includes information indicating the position of the joint of the link-sequence and information of the end portion is mainly described. The position described here is the position in the coordinate system set for the model link-sequence 5. The coordinate system here may be the coordinate system of the real space wherein the model 5 exists, or may be the coordinate system of the acquired virtual space of the position relating to the model link-sequence 5 or may be any other coordinate system.

The model link-sequence information may be obtained by the motion capture technology, for example. The motion capture may be performed, for example, by detecting the position of a marker attached to the model 5, or may be performed using a captured image of the model 5. The motion capture performed using the marker may be, for example, an optical motion capture, a mechanical motion capture or a magnetic motion capture. In addition, when the motion capture is performed using a captured image, the accuracy of the motion capture using the captured image may be improved by, for example, measuring the distance to the model 5. KINECT (registered trade mark), RealSense, or the like may be employed as a device for performing motion capture using a captured image.

In a case wherein mapping of the link-sequence is performed in real time, it is preferable that the receiving unit 11 repeatedly receives the model link-sequence information along a time series, for example, at constant or irregular time intervals. Namely, it is preferable that the movement of the model link-sequence 5 is known from the model link-sequence information received by the receiving unit 11. It should be noted that the model link-sequence information itself may be the information conforming to the time series relating to the model link-sequence 5. On the other hand, when mapping of link-sequence is not performed in real time, the receiving unit 11 may collectively receive a plurality of model link-sequence information pieces on the model link-sequence 5, for example, or may receive model link-sequence information one by one. Furthermore, when the model 5 has two or more link-sequences, the receiving unit 11 may receive the model link-sequence information for each link column of the model 5. In the present embodiment, a case wherein the model 5 is a human being and the model link-sequence information on the link-sequence concerning the human arm is periodically imputed from the motion capture device 2 to the link-sequence mapping device 1 in real time and received by the reception unit 11 is mainly explained. In addition, when the reception unit 11 receives a plurality of model link-sequence information pieces corresponding to a plurality of link-sequences, information that identifies the corresponding link-sequence (showing, for example, that it concerns a link-sequence of the right arm) may be included. Further, the receiving unit 11 may also receive information indicating the orientation of the model 5 (for example, information indicating the orientation of the face of the model 5, etc.) together with the model link-sequence information. By using the information indicating the orientation of the model 5, it becomes possible to know which link-sequence of the model 5 the model link-sequence information corresponds to.

Note that the receiving unit 11 may receive model row information transmitted via a wired or wireless communication line, for example, and may receive model link-sequence information transmitted from a predetermined recording medium (for example, an optical disk, a magnetic disk, a semiconductor memory, etc.). Note that the receiving unit 11 may or may not include a device (for example, a modem, a network, etc.) for receiving. Furthermore, the receiving unit 11 may be realized by hardware, or may be realized by software such as a driver for driving a predetermined device.

Figure 5:
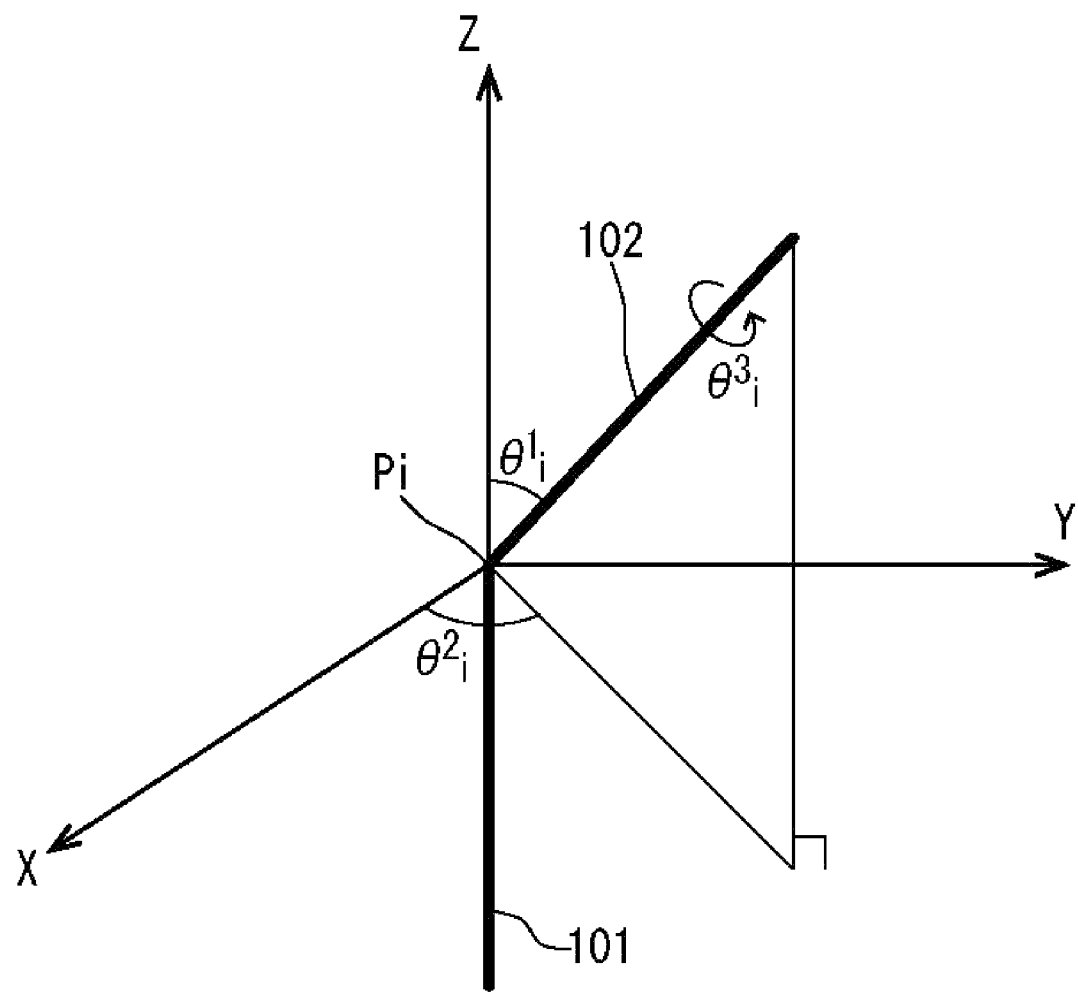
FIG. 5 is a diagram showing an example of an angle of a joint of a robot in the embodiment.

The storage unit 12 stores the joint movable range information indicating the range of motion of the joint in the robot link-sequence 6. It is preferable that the joint movable range information includes all the information regarding all the joints having restriction in its movable range. For example, when the angle of joint Pi between the links 101 and 102 in the robot link-sequence 6 is indicated by $\theta^1 i$, $\theta^2 i$, $\theta^3 i$, as shown in FIG. 5, the joint movable range information may be the information that indicates the range regarding an angle of more than 1 with a movable range restriction among $\theta^1 i$, $\theta^2 i$, or $\theta^3 i$. For example, in a case wherein the range of the angle $\theta^1 i$ is $\alpha^1_i \leq \theta^1_i \leq \beta^1_i$, the information regarding the angle $\theta^1_i$ included in the joint movable range information can be a lower limit $\alpha^1_i$ and an upper limit $\beta^1_i$ regarding the angle $\theta^1_i$. Note that, for joints and axes not limited in the range of motion, the range of motion may not be indicated by the range of motion of the joint. In addition, FIG. 5 shows a case wherein the joint Pi between the links 101 and 102 has 3 axes, however, the number of axes of the joint does not matter. The number of axes of a joint may be for example, one, two or three, or four or more. Also, the direction of the axis of the joint is arbitrary. Furthermore, in the joint having two or more axes, regarding information indicating the sequence of each axis, for example from the link 101 side to the link 102 side, in what sequence each axis is provided, may be stored in the storage unit 12.

In the present embodiment, the case wherein the robot 6 is a humanoid robot is mainly described, but this may not be a requirement. The robot 6 may be, for example, an animal robot such as a dog, a cat, a bird, a fish, a snake, an insect, or a robot of another shape. Further, it is assumed that the robot 6 has one or more operable link-sequences. The operable link-sequence may be, for example, a link-sequence connected by a plurality of points driven by a plurality of motors, respectively. In addition, the robot 6 is usually a robot for a toy, namely an entertainment robot, which is not, however, a requirement. Also, the number links LN1 in the model link-sequence 5 as the mapping source and the number of links LN2 in the robot link-sequence 6 as the mapping destination do not have to be equal. For example, the number of links LN1 in the model 5 can be larger or smaller than the number of links LN2 of the robot 6 and both of the numbers of links of LN1 and LN2 may not be equal. Note that the robot link-sequence 6 has a coordinate set up in a similar manner as in the case of robot 5. The coordinate here can be a coordinate of the actual space wherein the robot 6 exists, or a coordinate of a virtual space for indicating a positional relationship regarding the robot link-sequence 6 or further, another coordinate.

In the storage unit 12, information other than the joint motion range information may be stored. For example, the link length information indicating the length of each link in the robot link-sequence 6 may be stored in the storage unit 12. It is known as forward kinematics of a robot that the position of the robot link-sequence 6 can be specified by using the link length information and the angle of each joint in the robot link-sequence 6. Furthermore, for example, information on the direction of the axis of each joint in the robot link-sequence 6 may be stored in the storage unit 12. Information indicating a plurality of positions determined in the model link-sequence 5 in advance or information indicating plurality of positions determined in the model link-sequence 5 in advance or information indicating a plurality of positions in the model link-sequence 5 in advance or information indicating plurality of positions determined in the robot link-sequence 6 corresponding to the plurality of positions may be stored in the storage unit 12. Also, when the robot link-sequence 6 includes a link having a shape other than a straight line, information indicating the shape of the link may be stored in the storage unit 12. Furthermore, the time constant of the low-pass filter in the shape of shape of the link may be stored in the storage unit 12. Also, the time constant of the low-pass filter in the noise removing unit 16 to be described later may be stored in the storage unit 12.

The storing process of information in the storage unit 12 is not limited. For example, the information may be stored in the storage unit 12 via a recording medium, and the information transmitted via a communication line or the like may be stored in the storage unit 12. The information input via the input device may be stored in the storage unit 12. Storage in the storage unit 12 may be temporary storage in RAM or the like, or may be long-term storage. The storage unit 12 can be realized by a predetermined recording medium. (for example, semiconductor or memory, magnetic disk, optical disk, etc.)

The normalization unit 13 normalizes the length of the model link-sequence 5 and the length of the robot link-sequence 6. Normally, the length of the model link-sequence 5 indicated by the model link-sequence information received from the motion capture device 2 is different from the length of the robot link-sequence 6. Therefore, the normalizing unit 13 performs normalization, which is a process of matching the lengths of the both. In the normalization, the length of the model link-sequence 5 and the length of the robot link-sequence 6 may be set to "1" or may be set to other values. In the present embodiment, the former case is mainly explained. Note that the length of the link-sequence is the sum of the lengths of the links from one end to the other end of the link-sequence. When the lengths of the link-sequences in the model 5 and the robot 6 are normalized to 1, the normalizing unit 13 calculates the length of the model link-sequence 5, for example, and each coordinate value at the model link-sequence 5 may be divided by the length thus calculated to conduct normalization, and similarly the length of the robot link-sequence 6 is calculated and the normalization may be conducted by dividing the length of each link at the robot link-sequence 6 by the length of the link-sequence thus calculated. Note that in a case wherein the positions of both ends of each link in the model link-sequence 5 are shown by the model link-sequence information, the normalizing unit 13 can calculate each length of the model link-sequence 5 by calculating the length of each link and summing them up. Also, for example, in a case wherein the length and the angle of each link in the model link-sequence 5 are indicated by the model link-sequence information, the normalizing unit 13 can calculate the length of the model link-sequence 5 by summing up the length of each link. Furthermore, for example, in a case wherein the length of each link in the robot link-sequence 6 is stored in the storage unit 12, the normalizing unit 13 sums the lengths of the respective links, thereby obtaining the link of the robot 6. In addition, the normalization unit 13 may perform normalization by changing the unit of at least one coordinate system of the coordinate system of the model link-sequence 5 and the coordinate system of the robot link-sequence 6. For example, the normalization unit 13 may perform normalization by changing the units of the coordinate system so that the length of the model link-sequence 5 and the length of the robot link-sequence 6 become 1 in both coordinate systems.

The normalization unit 13 may set a coordinate system in which both the base end of the model link-sequence 5 and the base end of the robot link-sequence 6 become the origin at the time of this normalization process. And the processing of the specifying unit 14 and the calculating unit 15 in the latter part may be performed in that coordinate system. More specifically, the normalization unit 13, regarding each coordinate system of the model link-sequence 5 and of the robot link-sequence 6, may conduct coordinate transformation such as parallel translation, and coordinate transformation such as rotation may be performed on at least one of the coordinate systems, to let the base end of the link-sequence become the origin for making both coordinates identical. Furthermore, when the directions of the two coordinate systems coincide with each other, it is not necessary to perform coordinate transformation such as rotation. In the present embodiment, the case where the xyz orthogonal coordinate system is set as the final coordinate system showing the positions of the link-sequences of the model 5 and the robot 6 is described. Note that the base end of the link-sequence is, for example, the end point on the side of the body in the link-sequence corresponding to the human arm or leg, namely, the base end on the opposite side of the hand or foot tip (namely, the main body side). For example, in a case wherein a main body does not exist such as a link-sequence corresponding to a snake, either end part, for example, the caudal end or the cranial end may be regarded as the base end. Note that the endpoint on the opposite side of the proximal end may be called a tip. Also, the normalization with respect to the robot link-sequence 6 may be performed only once because the length of each link in the robot link-sequence 6 never changes. On the other hand, the length of each link in the model link-sequence 5 may change with time depending on the method of acquiring the model link-sequence information. In this way, when the length of each link in the model link-sequence 5 can change, normalization with respect to the model link-sequence 5 is preferably performed each time the receiving unit 11 receives information on the model link-sequence 5. On the other hand, in a case wherein the length of each link in the model link-sequence 5 does not change, for example, the normalization unit 13 normalizes the model link-sequence 5 once, and by passing that normalized coordinate system and such to the motion capture device 2 and the normalized model link-sequence information is thus arranged to be received, thereafter. The coordinate values of the model 5 and the robot 6 used by the specifying unit 14 and the calculating unit 15 are the coordinate values after being normalized by the normalizing unit 13. Also, after the normalization is performed and the base ends of both link-sequences are regarded as the origin, it is preferable that the position of the model link-sequence 5 and the position of the robot link-sequence are expressed in one coordinate system. In the present embodiment, a case where the positions of the model 5 and model 6 are indicated by the above-described xyz orthogonal coordinate system after the base ends of both link-sequences are set as the origin is mainly described.

The specifying unit 14 specifies coordinate values of a plurality of predetermined points in the model link-sequence 5 using the model link-sequence information received by the receiving unit 11. Further, the identification of the coordinate value is the identification of the coordinate value after the normalization by the normalization unit 13. Also, in the present embodiment, the case where the coordinate value is the coordinate value in the xyz orthogonal coordinate system is mainly explained. Namely, a plurality of predetermined points in the model link-sequence 5 is a plurality of points internally dividing both ends of the link-sequence by the predetermined ratio. Namely, the plurality of points is the plurality of points corresponding to a plurality of points that divide the both ends of the link-sequence by a predetermined ratio. Therefore, these plural points are determined irrespective of the position of the link-sequence. Further, it is preferable that the number of the plurality of places is larger than the number of the connecting points in the robot link-sequence 6. The linking position in the link-sequence is the location where a link and another link are connected in the link-sequence. In general, since the value obtained by adding 1 to the number of connection points in the link-sequence is the number of links in the link-sequence, it can be rephrased in other words that it is preferable that the number of the plurality of positions is equal to or larger than the number of links in the robot link-sequence 6. In addition, the positions of the plurality of positions may or may not be uniformly provided. Furthermore, one or both ends of the model link-sequence 5 may be included in the plurality of positions, or may not be included. In addition, it may be thought that a plurality of locations internally dividing between both end points of a link-sequence at a predetermined ratio means a plurality of portions internally dividing between both end points with a predetermined ratio in a case wherein the link-sequence is linearly extended. Each of the plurality of positions may be called a reference point. Also, specifying the coordinate value may mean to accumulate the specified coordinate value in a recording medium.

The calculating unit 15 calculates the robot link-sequence information which is information regarding the position of each link included in the robot link-sequence 6 in order to make the objective function corresponding to a plurality of points with specified coordinate values by the specifying unit 14 and a plurality of points in the robot link-sequence 6 small. Here, each of a plurality of positions in the robot link-sequence 6 corresponding to a plurality of reference points in the model link-sequence 5 may be called reference point. A plurality of positions at the robot link-sequence 6 corresponding to each of the plurality of points at the model link-sequence 5 specified by the specifying unit 14 may be, for example, a plurality of points for internally dividing the range between the two end points of the robot link-sequence 6 by a predetermined ratio. The predetermined ratio may be the same ratio as the predetermined ratio regarding the plurality of points at the model link-sequence 5 or may be different. In the latter case, for example, a plurality of reference points at the model link-sequence 5 and a plurality of reference points at the robot link-sequence 6 may be determined so that the movement of the model 5 being a human being becomes an exaggerated movement of the robot 6. In either case, when the number of a plurality of points exceeds the number of link points in the robot link-sequence 6, the ratio may be set so that at least one point exists at each link in the robot link-sequence 6. In a case wherein the predetermined ratio regarding the model link-sequence 5 and the predetermined ratio at the robot link-sequence 6 are the same, a reference point of the same ratio becomes a corresponding reference point at the model link-sequence 5 and the robot link-sequence 6. On the other hand, in a case wherein the ratios of the both differs, a plurality of reference point at the model link-sequence 5 and a plurality of reference point at the robot link-sequence 6 are to correspond respectively from the base end in turn.

Each distance between the plurality of locations specified by the specifying unit 14 and the plurality of locations in the robot link-sequence 6 corresponding to each of the plurality of the locations is the distance between a specified reference point and the reference point at the rink row of the robot 6 corresponding to the reference point. The objective function corresponding to each distance may be a function whose value increases with the increase of each distance. Specifically, the objective function may be obtained by adding the square of each distance. In that case, mapping using the least square method is resultantly performed. Further, the objective function may be obtained by adding the absolute value of each distance. In that case, mapping using the minimum absolute value method is performed. It goes without saying that other objective functions whose values increase as each distance becomes larger may be used. Each distance is the distance after normalization, that is, the distance calculated using the normalized coordinate value. Further, each distance is a distance calculated corresponding to the coordinate value in the coordinate system with the base end of the model link-sequence 5 and the robot 6 as the origin, namely the distance calculated using the coordinate value. In addition, calculating the robot link-sequence information for making the objective function small is to calculate the position of the robot link-sequence 6 so that the objective function becomes small. Since the length of each link in the robot link-sequence 6 is usually constant, the position of the robot link-sequence can be specified by the angle of each joint in the robot link-sequence 6. Therefore, calculating the position of the robot link-sequence 6 may be to calculate the angle of each joint in the link-sequence. In that case, the robot link-sequence information may be information indicating the angle of each joint in the robot link-sequence 6. If the proximal end of the link-sequence is also a joint, the robot link-sequence information may include the angle of the joint that is the proximal end thereof. On the other hand, the robot link-sequence information may be information other than the angle of the joint. For example, the robot link-sequence information may be information indicating the positions of both ends of each link in the robot link-sequence 6, or may be coordinate values of a plurality of reference points in the robot link-sequence 6. When the robot link-sequence information is each coordinate value of a plurality of reference points in the robot link-sequence 6, it is preferable that the position of the link-sequence can be uniquely specified by each coordinate value of the plurality of reference points. In the present embodiment, a case wherein the robot link-sequence information is information indicating the angle of each joint in the robot link-sequence 6 is mainly described. In that case, for example, the information for identifying the joint and the information indicating the angle in the joint may be mutually associated in the robot link-sequence information, and information for identifying the axis of the joint and the angle on the axis may be mutually associated and further the information for identifying the axis of the joint and the information for indicating the angle at the axis may be mutually associated. Also, the position of the base end of the robot link-sequence 6 may be fixed or may not be fixed when the robot link-sequence information is calculated. In the present embodiment, the former case is described. Note that, in the case of the latter, the information indicating the position of the base end of the robot link-sequence 6 may also be included in the robot link-sequence information.

When the robot link-sequence information is calculated so that the objective function becomes small, the calculating unit 15 can use an arbitrary algorithm for solving the optimization problem. Note that when solving the optimization problem, it may be solved so as to be local optimum or it may be solved so as to be global optimum. In the present embodiment, mainly the case wherein the optimization problem is solved so as to be local optimum is described. For example, the calculating unit 15 may calculate the robot link-sequence information so that the objective function becomes smaller by the gradient method which is an algorithm using the derivative of the objective function, or may calculate the robot link-sequence information so that the objective function becomes smaller by an algorithm that does not employ the derivative of the objective function. Also, the calculating unit 15 calculates the robot link-sequence information so that the objective function becomes smaller within the range of motion indicated by the information of the joint range of motion stored in the storage unit 12. Namely, the calculation unit 15 may solve the optimization problem with the joint range information as a constraint condition. Also, calculating the robot link-sequence information so that the objective function becomes smaller may mean to calculate the robot link-sequence information so that the objective function is minimized, or to calculate the robot link-sequence information so that the objective function becomes near to minimum. Here, the objective function becoming minimum means that the objective function becomes a minimum value, in a strict sense, or that the objective function is sufficiently close to the minimum value. In a case wherein the robot link-sequence information is calculated, for example, by repeating the iterative processing such as the Newton method when calculating the robot link-sequence information so as to reduce the objective function and finish the processing before converging completely, it cannot be said that the robot link-sequence information that minimizes the objective function in a strict sense is calculated but it can be said that the robot link-sequence information is calculated so that the objective function is sufficiently close to the minimum value. Furthermore, when calculating the robot link-sequence information so that the objective function becomes smaller and the next model link-sequence information is received by the receiving unit 11, the calculating unit 15 may calculate the robot link-sequence information corresponding to the newly received model link-sequence information after passing on the robot link-sequence information at that time to the noise elimination unit 16 in the subsequent stage. Even in such a case, the calculation unit 15 calculates the robot link-sequence information so that the objective function becomes close to the minimum. As described above, when the calculation unit 15 finishes the processing while sequentially performing the processing so as to minimize the objective function, the robot link-sequence information at the time of the end may be regarded as the robot link-sequence information calculated so that the objective function becomes smaller.

Note that the model link-sequence 5 and the robot link-sequence 6 whose objective functions are to be made smaller by the calculation unit 15 may be pre-determined or may not be predetermined. In the latter case, for example, the robot link-sequence 6 corresponding to each link of the model 5 may be arranged to be identified according to a predetermined rule. More specifically, when the model 5 is a human being and the robot 6 is a humanoid robot, there may be a rule that the link-sequences close to the head are made to correspond to each other and also there may be a rule that a link-sequences on the right side (or on the left side) near the head against the direction of the head (for example, the direction of the face of the head) are set as the corresponding link-sequence. By this rule, the link-sequence of the arm can be coordinated. There may also be a rule that the link-sequences far from the head are made to be link-sequences that correspond to each other, and there may further be a rule that the link-sequences far from the head and the link-sequences on the right side (or left side) toward the direction of the head are defined as the corresponding link-sequences. Based on this rule, the link-sequences of the foot can be associated.

The noise removal unit 16 removes a high-frequency noise component included in the robot link-sequence information. For example, when model link-sequence information is acquired by the motion capture device 2, high-frequency noise components may be included in the model link-sequence information. In this case, as a result, high-frequency noise component can also be included in the robot link-sequence information and it is preferable to remove the noise component by the noise removal unit 16. The noise removal unit 16 may be, for example, a low-pass filter. The noise removing unit 16 may function as a low-pass filter by, for example, performing moving average processing on the robot link-sequence information calculated by the calculating unit 15. As the time constant of the low-pass filter, the noise removal unit 16 may read and use what is stored in the storage unit 12.

The output unit 17 outputs information on the angle of each joint of the robot link-sequence 6 according to the robot link-sequence information. The robot link-sequence information is robot link-sequence information in which high frequency noise components are removed by the noise removing unit 16. In the case where mapping processing is performed in real time, the output unit 17 may repeat the information along the time series and output at constant or irregular time intervals. In this case, for example, the robot 6 operates in accordance with the movement of the model 5.

On the other hand, when the mapping process is not performed in real time, the output unit 17 may sequentially output the information or collectively output the information. In this case, for example, the robot 6 may reproduce the same movement as the past movement of the model 5. Furthermore, when the robot 6 has two or more link-sequences, the output unit 17 may output information for each link-sequence of the robot 6. When the robot link-sequence information is information on the angle of each joint of the robot link-sequence 6, the output unit 17 may output the robot link-sequence information as it is. When the robot link-sequence information is information indicating the position of the robot link-sequence 6, the output unit 17 outputs the robot link-sequence information by converting the robot link-sequence information into information on the angle of each joint of the robot link-sequence 6. For example, in FIG. 5, when the positions of the links 101 and 102 are known, the robot link-sequence information can be converted into information regarding the angle of each joint in the robot link-sequence 6 using the method for identifying the angle regarding each axis of the joint Pi, because this method is publicly known. The information regarding the angle of each joint of the robot link-sequence 6 can be the information showing the angle of each joint and also the information that enables to know the angle of each joint, as a result.

Here, this output can be any output as long as the information of the output target is received as a result by the robot 6, and the output may be transmission via wired or wireless communication line to the robot 6, for example, or may be stored in a recording medium or may be delivered to another component. Note that, even in cases wherein accumulation of information into a recording media or transferring of information to another component are performed by the output unit 17, it goes without saying that the information preferably reaches the robot 6 in the end. Also, it goes without saying that the information to be output may go under processing such as format transformation, appropriately until it is received by the robot 6. Note that the output unit 17 may or may not include a device that performs output (for example a transmission device or the like). Further, the output unit 17 may be realized by hardware or may be realized by software such as a drive etc. for driving these devices.

Next, the operation of the link-sequence mapping device 1 is explained with reference to the flowchart in FIG. 2.

(Step S101) The normalization unit 13 normalizes the robot link-sequence 6.

(Step S102) The reception unit 11 determines whether or not the model link-sequence information has been received. When the model link-sequence information is received, the process proceeds to step S103. Otherwise, the process of the step S102 is repeated until the model link-sequence information is received.

(Step S103) The normalization unit 13 normalizes the model link-sequence 5 corresponding to the model link-sequence information received by the step S102.

(Step S104) The specification unit 14 specifies the coordinate values of plurality of positions predetermined at the model link-sequence 5 normalized by the step S103.

(Step S105) The calculating unit 15 calculates the robot link-sequence information so that the objective function corresponding to each distance between a plurality of locations the coordinate values thereof is specified at the step S104 and a plurality of locations at the robot link-sequence 6, respectively becomes small.

(Step 106) The noise removal unit 16 removes the high-frequency noise components included in the robot link-sequence information calculated in step S105.

(Step S107) The output unit 17 outputs information on the angle of each joint of the robot link-sequence 6 according to the robot link-sequence information therefrom the high frequency noise components has been removed. And the process returns to step S102.

Figure 2:
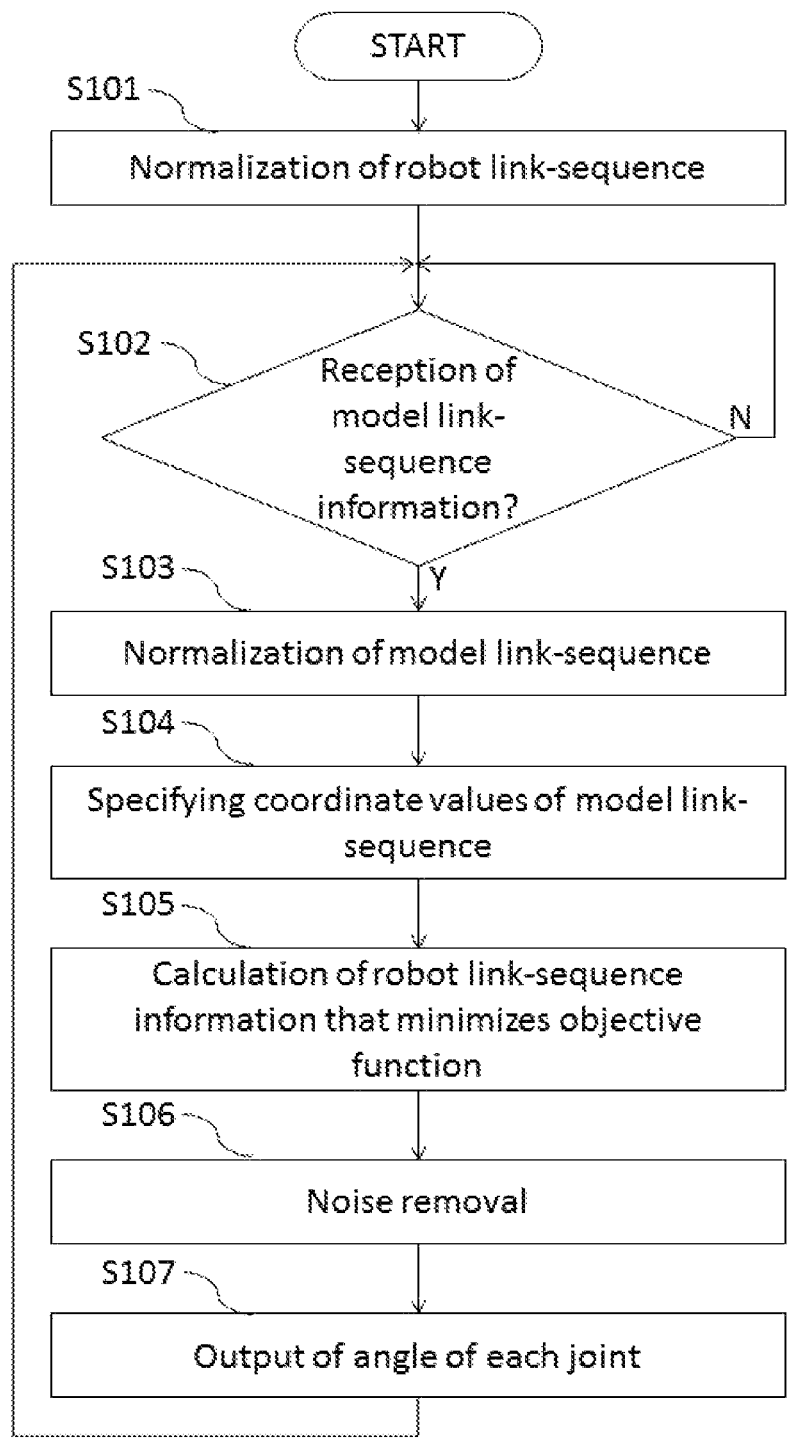
FIG. 2 is a flowchart showing an operation of a link-sequence mapping device in the same embodiment.

Note that, in the case wherein the real-time processing in the flow chart in FIG. 2 is performed, while computing the robot link-sequence information in the step S105, it may be arranged that the processing of receiving the model link-sequence information is executed in parallel, the step S105 for receiving the model link-sequence information is interrupted, and together with executing the output (Step S106 and Step S107) corresponding to the robot link-sequence information at the time, the process corresponding to the model link-sequence information newly received may be executed. Also, in the case wherein the model 5 and the robot 6 possess a plurality of link-sequences in the mapping relationship, the link-sequence mapping device 1 may repeatedly execute the processes of steps S102~S107 or execute them in parallel. More specifically, in a case wherein mapping of both hands and both feet are being executed, the processing of the steps S102~S107 may be repeated for 4 link-sequences or may be executed in parallel. Also, in the flow chart in FIG. 2, the processing is terminated by turning off of the power or interruption of the process termination.

Next, the operation of the link-sequence mapping device 1 of the present embodiment is described using a specific example. In this specific example, the case wherein the model link-sequence 5 is a human arm and the robot link-sequence is the arm of the humanoid robot. Namely, the case wherein the human arm is mapped to the arm of the humanoid robot is described. In this specific example, let n be the number of links in the model link-sequence 5 and let N be the number of links in the robot link-sequence 6. n and N are integers of 1 or more, respectively.

Figure 3:
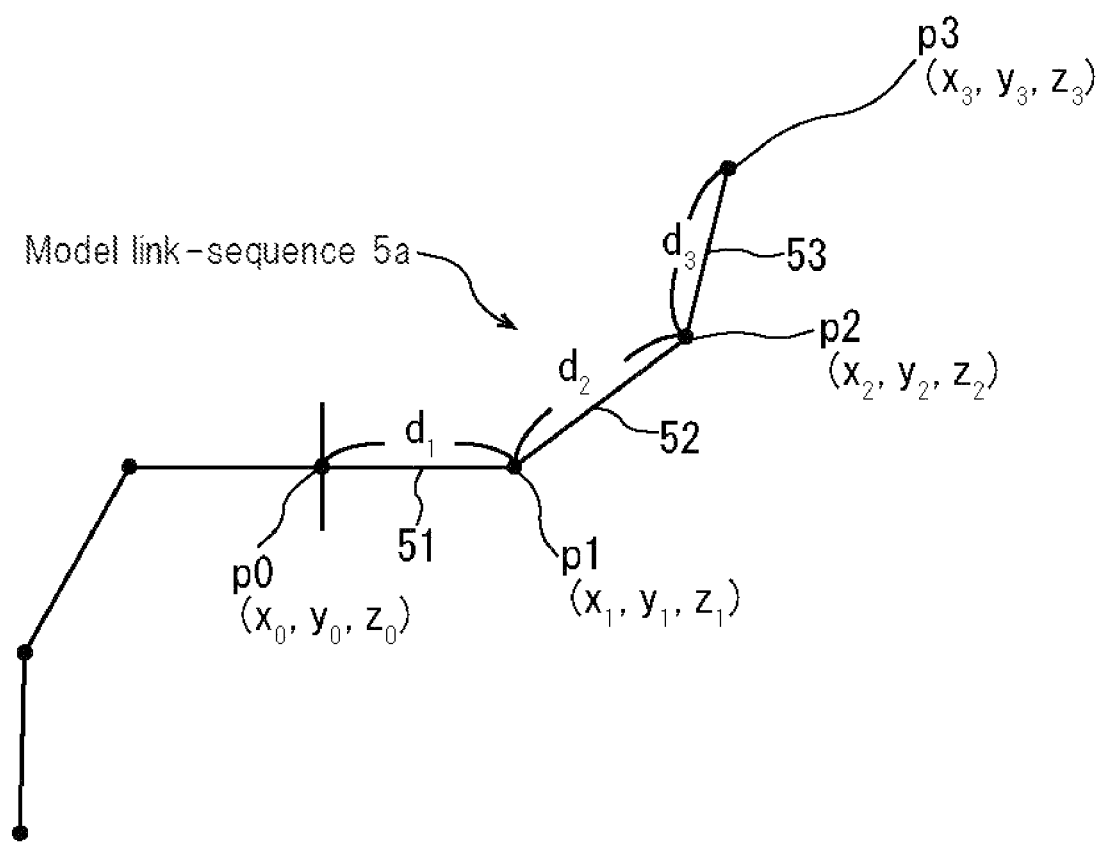
FIG. 3 is a diagram showing an example of a model link-sequence in the same embodiment.

FIG. 3 is a diagram showing one example of the link-sequence 5a of the model 5 which is a human being. The link-sequence 5a to be mapped is composed of links 51~53, the end point p0 as a joint is the center of both shoulders, the joint 1 is a shoulder, the joint p2 is an elbow, and the end point p3 is a fingertip. Note that in FIG. 3, in order to simplify the explanation, the wrist joint is omitted. In FIG. 3, the coordinates of p0 to p3 are expressed by $(x_0, y_0, z_0)$, $(x_1, y_1, z_1)$, $(x_3, y_3, z_3)$ in the xyz orthogonal coordinate system. Let the lengths of the links 51 to 53 be $d_1$, $d_2$ and $d_3$, respectively. In FIG. 3, the number of links n=3.

Figure 4:
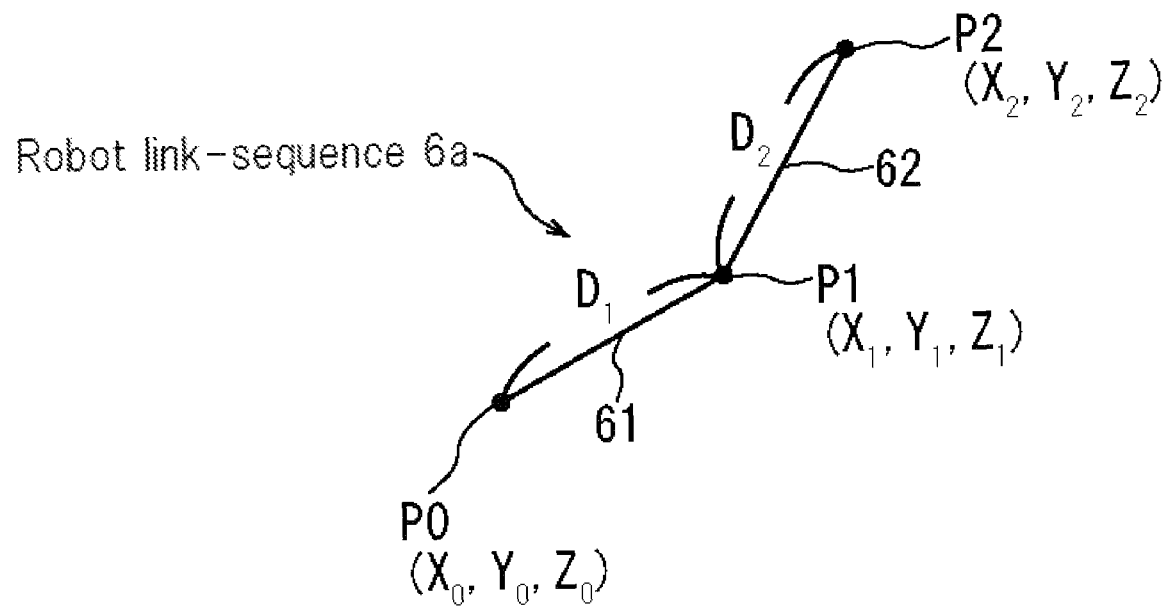
FIG. 4 is a diagram showing an example of a robot link-sequence in the same embodiment.

FIG. 4 is a diagram showing an example of the link-sequence 6a of the robot 6 which is a humanoid robot. The link-sequence 6a as the mapping destination is composed of the links 61 and 62, the end point P0 being a joint is a shoulder, the joint P1 is an elbow, and the end point P2 is a fingertip. In FIG. 4, the coordinates of P0~P1 are expressed by $(X_0, Y_0, Z_0)$, $(X_1, Y_1, Z_1)$ and $(X_2, Y_2, Z_2)$ in the XYZ orthogonal coordinate system. Also the lengths of the link 61 and 62 are expressed by $D_1$ and $D_2$, respectively. These $D_1$ and $D_2$ are assumed to be stored in the storage unit 12. Also, let the angles at the joint Pi be $\theta^1_i, \theta^2_i, \ldots, \theta^{ki}_i$. In addition, ki is an integer of 1 or more indicating the number of axes in the joint Pi. i=0,1. In FIG. 4, the number of links N=2.

Both the xyz orthogonal coordinate system and the XYZ rectangular coordinate system are local coordinate systems set in the model 5 and the robot 6, and it is assumed that the xyz axes correspond to the XYZ axes, respectively. For example, the z axis and the Z axis are set in the body axis direction, x axis and X axis may be set in the anteroposterior direction and the y axis and Y axis may be set in the lateral direction. The body axis direction refers to the vertical direction at the standing position of a human being or a humanoid robot.

First of all, the normalization unit 13 normalizes the robot link-sequence 6 (step S101). More specifically, the normalizing unit 13 calculates the length D of the link-sequence using the length $D_1$ etc. of the link stored in the storage unit 12 as expressed by the following equation.

$$D = \sum_{i=1}^{N} D_i \qquad \text{[Equation 1]}$$

Next, the normalizing unit 13 translates the XYZ orthogonal coordinate system so that P0 becomes the origin. Specifically, $(X_i, Y_i, Z_i)$ may be $(X_i-X_0, Y_i-Y_0, Z_i-Z_0)$. Herein, i=0~N. Furthermore, in the XYZ orthogonal coordinate system after the parallel translation, the length of the robot link-sequence 6 becomes 1 by multiplying each coordinate value by 1/D. Specifically, $(X_i, Y_i, Z_i)$ may be $(X_i/D, Y_i/D, Z_i/D)$. Note that the order of the parallel movement process and the 1/D multiplying process does not matter. Also, the normalization unit 13 normalizes the length D1 etc. of the link stored in the storage unit 12 by being multiplied by 1/D. In the following description, let $(X_i, Y_i, Z_i)$ and Di be the coordinates and the length of the link after translation and normalization.

Thereafter, it is assumed that the reception unit 11 has received model link-sequence information (step S102). The model link-sequence information is assumed to be information indicating the positions of both ends of each link in the model link-sequence 5, that is, $(x_0, y_0, z_0)$, $(x_1, y_1, z_1)$, . . . , $(x_n, y_n, z_n)$. Then, the normalization unit 13 normalizes the model link-sequence 5 (step S103). Specifically, the normalizing unit 13 calculates the lengths $d_1$ to $d_n$ of the respective links by using the model link-sequence information following the formula below.

$$d_i = \sqrt{(x_i-x_{i-1})^2+(y_i-y_{i-1})^2+(z_i-z_{i-1})^2} \qquad \text{[Equation 2]}$$

Thereafter, the normalizing unit 13 calculates the length d of the link-sequence as follows, using the calculated link lengths $d_1$ and the like.

$$d = \sum_{i=1}^{n} d_i \qquad \text{[Equation 3]}$$

Next, the normalizing unit 13 translates the xyz orthogonal coordinate system so that p0 becomes the origin. Specifically, $(x_i, y_i, z_i)$ may be set to $(x_i-x_0, y_i-y_0, z_i-z_0)$. Herein, i=0~n. Also, the length of the model link-sequence 5 becomes 1 by multiplying each coordinate value by 1/d in the xyz orthogonal coordinate system after the parallel movement. Specifically, $(x_i, y_i, z_i)$ may be expressed by $(x_i/d, y_i/d, z_i/d)$. Further, the sequence of the translation process and the process of multiplying 1/d does not matter. Also, the normalizing unit 13 normalizes the calculated link length $d_1$, etc. by multiplying 1/d. In the following description, let $(x_i, y_i, z_i)$ be the coordinates after translation and normalization and $d_i$ be the length of the link. In this specific example, since the orientation of the model 5 in the xyz orthogonal coordinate system coincides with the orientation of the robot 6 in the XYZ orthogonal coordinate system, the coordinate values of the model 5 and the robot 6 are arranged to be indicated by the XYZ orthogonal coordinate system. Namely, $(X_i, Y_i, Z_i)$ and such are made to be coordinated values in the xyz orthogonal coordinate system.

In this specific example, it is assumed that the objective function corresponding to the distance of the part dividing the model link-sequence 5 and the robot 6 into m pieces is used. Further, it is assumed that a plurality of points predetermined in the link-sequence of model 5 is m−1 points. Also, in the model link-sequence 5, the m−1 locations are the positions where the length from the base end side is $g_1, g_2, \ldots, g_{m-1}$, assuming that the length of the link-sequence is 1. For example, in the case wherein the model link-sequence 5 is equally divided into m pieces, $g_i=i/m$. Here, it is assumed that $g_0=0$ and $g_m=1$. Also, let the coordinates of the reference point corresponding to $g_i$ be $(a_i, b_i, c_i)$. Further, m is an integer of 2 or more.

Further, (m−1) locations at the robot link-sequence 6 corresponding to (m−1) locations in the model link-sequence 5, are the positions where the lengths from the base end side become $G_1, G_2, \ldots, G_{m-1}$ when the length of the link-sequence is assumed to be 1. For example, when the robot link-sequence 6 is equally divided into m pieces, $G_i=i/m$ holds. Note that $G_0=0$ and $G_m=1$ are assumed. Also, let the coordinates of the reference point corresponding to $G_i$ be $(A_i, B_i, C_i)$. Also, as mentioned above, $g_i=G_i$ may or may not hold. In addition, $g_1$ to $g_{m-1}$ and $G_1$ to $G_{m-1}$ may be stored in the storage unit 12.

The specifying unit 14 reads out $g_1$ to $g_{m-1}$ from the storage unit 12 and specifies coordinate values of a plurality of positions in the model link-sequence 5 by using them (step S104). More specifically, $$\sum_{i=0}^{j-1} d_i \leq g_i < \sum_{i=0}^{j} d_i \quad \text{[Equation 4]}$$

in the case where $g_i$ holds, the specifying unit 14 specifies, regarding the i, the point by which the length from $(x_{j-1}, y_{j-1}, z_{j-1})$ assuming the length of the link with $(x_{j-1}, y_{j-1}, z_{j-1})$ and $(x_j, y_j, z_j)$ as the both ends being 1, expressed by equation 5, as the ith reference point $(a_i, b_i, c_i)$.

$$\frac{g_i - \sum_{i=0}^{j-1} d_i}{d_j} \quad \text{[Equation 5]}$$

In such a way, by performing the process of specifying the location $(a_i, b_i, c_i)$ corresponding to $g_i$ that satisfies the above equation for j=1 to n, it is possible to determine the coordinate value of each of a plurality of predetermined positions in the model link-sequence 5. The specified coordinate values $(a_i, b_i, c_i)$ may be stored in a recording medium (not shown). Note that $d_0=0$ is assumed.

Here, a method of specifying the reference point $(A_i, B_i, C_i)$ in the robot link-sequence 6 corresponding to the reference point $(a_i, b_i, c_i)$ is described. Similarly in the case of the model link-sequence 5, $$\sum_{i=0}^{j-1} D_i \leq G_i < \sum_{i=0}^{j} D_i \quad \text{[Equation 6]}$$

in a case wherein $G_i$ satisfying Equation 6 exists, regarding the i here, the point by which the length from $(X_{j-1}, Y_{j-1}, Z_{j-1})$ is expressed by equation 7, $$\frac{G_i - \sum_{i=0}^{j-1} D_i}{D_j} \quad \text{[Equation 7]}$$

assuming the length of the link with $(X_{j-1}, Y_{j-1}, Z_{j-1})$ and $(X_j, Y_j, Z_j)$ as the both ends being 1, becomes the ith reference point $(A_i, B_i, C_i)$. By performing the process of specifying the location $(A_i, B_i, C_i)$ corresponding to $G_i$ that satisfies the above equation for j=1 to N, it becomes possible to determine the coordinate value of each of a plurality of predetermined positions in the robot link-sequence 6. The specified coordinate values $(A_i, B_i, C_i)$ may be stored in a recording medium (not shown). Note that $D_0=0$ is assumed.

Note that, in the robot link-sequence 6, the position of the end point on the tip side of the link can be expressed by using the position of the end point of the base end side of the link and the angle of the joint at the end point on the base end side. For example, the equation below explains this. Note that i=1 to N, and the function $F_i$ is a function indicating the relative position of P(i+1) with respect to Pi with the angles $\theta^1_i, \theta^2_i, \ldots, \theta^{ki}_i$ of the joint Pi as arguments.

$$(X_i, Y_i, Z_i) = (X_{i-1}, Y_{i-1}, Z_{i-1}) + F_{i-1}(\theta^1_{i-1}, \theta^2_{i-1}, \ldots, \theta^{k(i-1)}_{i-1})$$

Therefore, since each coordinate value $(A_j, B_j, C_j)$ can be expressed by using the angle of each joint Pi, it can be expressed, for example, by the following expression. Note that j=1 to m−1. Also, depending on the position of $(A_j, B_j, C_j)$, the argument of the function $G_j$ can change, but the following expression describes the case where the argument is the largest. Since this relationship does not change unless a plurality of positions in the robot link-sequence 6 are changed, when identifying coordinate values of a plurality of points in the model link-sequence 5, the specifying unit 14 specifies a plurality of coordinate values, and the calculated result may be stored in the storage unit 12 or a recording medium (not shown).

$$(A_j, B_j, C_j) = G_j(\theta^1_0, \theta^2_0, \ldots, \theta^{k0}_0, \theta^1_1, \theta^2_1, \ldots, \theta^{k1}_1, \ldots, \theta^1_{N-1}, \theta^2_{N-1}, \ldots, \theta^{k(N-1)}_{N-1})$$

Thereafter, the calculation unit 15 calculates robot link sequence information that minimizes the objective function E (step S105). Specifically, the objective function E of the following equation is a function with $\theta^1_0, \theta^2_0 \ldots \theta^{k0}_0, \theta^1_1, \theta^2_1, \ldots, \theta^{k1}_1, \ldots, \theta^1_{N-1}, \theta^2_{N-1}, \ldots, \theta^{k(N-1)}_{N-1}$ as arguments. Therefore, the calculating unit 15 calculates the angles $\theta^1_0, \theta^2_0, \ldots, \theta^{k0}_0, \theta^1_1, \theta^2_1, \ldots, \theta^{k1}_1, \ldots, \theta^1_{N-1}, \theta^2_{N-1}, \ldots, \theta^{k(N-1)}_{N-1}$ of each joint at which the objective function E of the following equation becomes minimum and passes the robot link-sequence information which is the calculation result thereof to the noise removing unit 16.

$$E = \sum_{j=1}^{m-1} [(a_j - A_j)^2 + (b_j - B_j)^2 + (c_j - C_j)^2] \quad \text{[Equation 8]}$$

Figure 6:
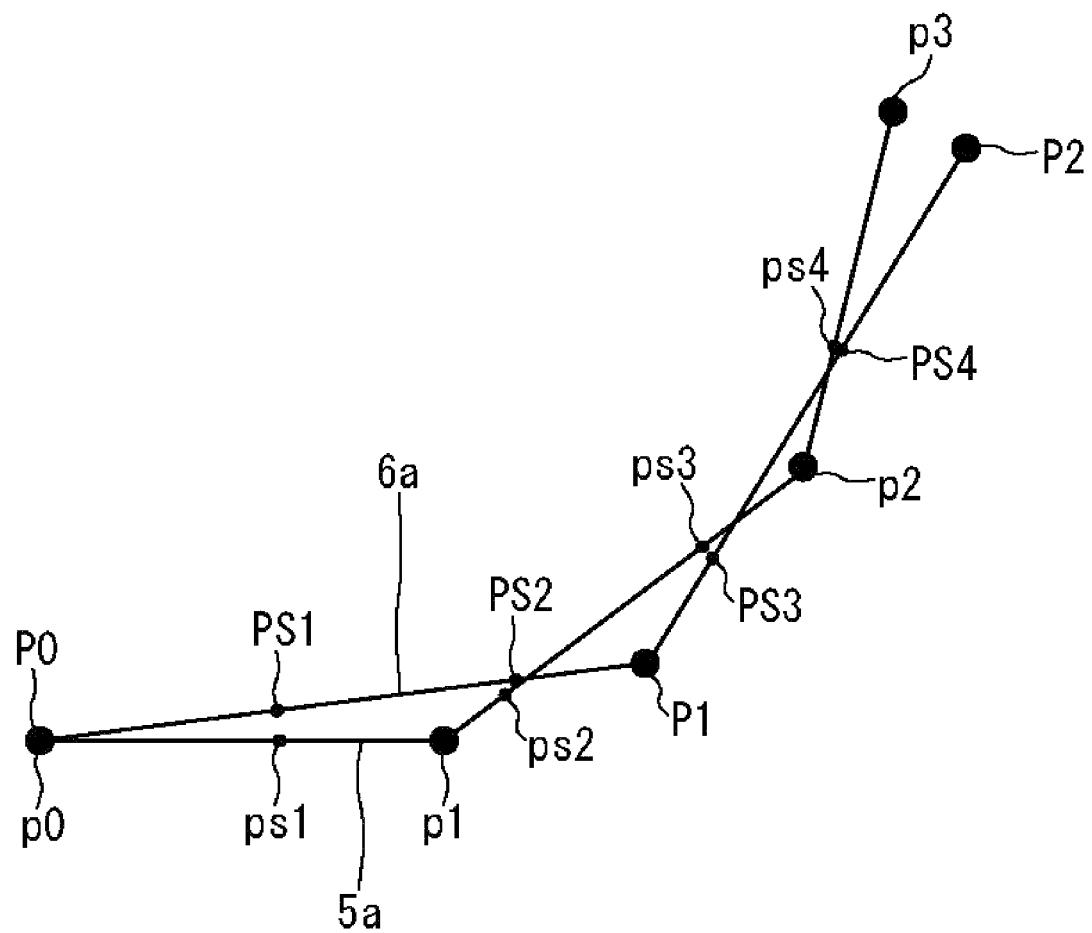
FIG. 6 is a diagram showing an example of a normalized model and a robot link-sequence in the same embodiment.

The objective function E mentioned above, for example in the FIG. 6, becomes a sum of a square of a distance between the reference point ps1 and the reference point PS1, a square of a distance between the reference point ps2 and the reference point PS 2, a square of the distance between the reference point ps3 and the reference point PS 3 and a square of the distance between the reference point ps4 and the reference point PS4. Further, in a case wherein the both end points of the link-sequence are reference points, the distance thereof may be included in the objective function. In such a case, summation from j=0 to j=m in the above mentioned objective function E should be good. Note that $(a_0, b_0, c_0)=(x_0, y_0, z_0)$, $(a_m, b_m, c_m)=(x_n, y_n, z_n)$, $(A_0, B_0, C_0)=(X_0, Y_0, Z_0)$ and $(A_m, B_m, C_m)=(X_n, Y_n, Z_n)$ are to be assumed. In FIG. 6, the lengths of both link-sequences 5*a* and 6*a* are equal and the endpoints p0 and P0 on base end sides coincide because link-sequences 5*a* and 6*a* after normalization are shown. In a case wherein the base ends of the link-sequence are reconciled in such a way, the distance between the reference points is 0 and the summation may be from J=1 to J=m in the objective function above.

Note that, in the above objective function E, $(a_i, b_i, c_i)$ is the coordinate value specified by the specifying unit 14, and $(A_i, B_i, C_i)$ is expressed by the angle of each joint $\theta^1_0, \theta^2_0, \ldots, \theta^{k0}_0, \theta^1_1, \theta^2_1, \ldots, \theta^{k1}_1, \ldots, \theta^1_{N-1}, \theta^2_{N-1}, \ldots, \theta^{k(N-1)}_{N-1}, \ldots, \theta^1_{N-1}, \theta^2_{N-1}, \ldots, \theta^{k(N-1)}_{N-1}$. Accordingly, in a case wherein the angles $\theta^1_0, \theta^2_0, \ldots, \theta^{k0}_0, \theta^1_1, \theta^2_1, \ldots, \theta^{k1}_1, \ldots, \theta^1_{N-1}, \theta^2_{N-1}, \ldots, \theta^{k(N-1)}_{N-1}$ that make its objective function E minimum are to be found by the gradient method, for example, the objective function E is partially differentiated with the angle θ10 and so on, and the position where the objective function E takes the minimum value with respect to the angle $\theta^1_0$ and so on may be obtained, respectively.

The noise removal unit 16 removes the high-frequency noise component from the robot link-sequence information received from the calculation unit 15, and passes the removed robot link-sequence information to the output unit 17 (step S106). When removing the noise by the moving average processing, the noise removing unit 16 may temporally store a predetermined number of the latest robot link-sequence information.

The output unit 17 outputs the robot ink row information received from the noise removal unit 16 to the robot 6 (step S107). As a result, the robot 6 controls the motors etc. of the respective joints so that each joint of the link-sequence becomes the angle included in the robot link-sequence information. By doing so, the shape of the model link-sequence 5 is similar to the shape of the robot link-sequence 6. By repeating such operations, the robot 6 can control so as to mimic the operation of the model 5, and the robot 6 can be operated as a mirror robot.

An example of the operation of the robot 6 as a mirror robot is specifically explained. Let's assume that, as shown in FIG. 7, the model 5 moves the link-sequence 5*a* corresponding to the arm from the downward position 5*a*-1 to the upward position 5*a*-3 via the side position 5*a*-2, as an arrow AR1 shown in FIG. 7. It is assumed that the arm in not twisted in the series of operations. Namely, in the joint p0 and p1, it is assumed that only rotation about the axis in the direction perpendicular to the page of FIG. 6 is performed. On the other hand, it is assumed that the upper limit of the range wherein the link-sequence 6*a* corresponding to the arm of the robot 6 can raise the arm from the downward position 6*a*-1 without twisting the arm is to as high as the position 6*a*-2 on the side. Accordingly, it is impossible to perform mapping from the side position 6*a*-2 without twisting the arm. Therefore, when the model link-sequence 5 moves the side position 5*a*-2 to the upward position 5*a*-3, in order to minimize the objective function E, the calculation unit 15 calculates the robot link-sequence information wherein the arm is twisted by 180° at the joint P0. Therefore, in the case of operating the link-sequence 6*a* of the robot 6 so as to minimize the objective function E, the link-sequence 6*a* thereof moves in a manner as shown by an arrow AR2 without twisting the arm from the downward position 6*a*-1 to the lateral position 6*a*-2 and after that, the link-sequence 6*a* being rotated by 180° and moves from the lateral position to the upward position 6*a*-3 in a manner as shown by an arrow AR4. As a result, in the upward positions 5*a*-3, 6*a*-3, the shapes of both arms can be similar although the palm of the model 5 is outwardly oriented and the palm of the robot 6 is inwardly oriented.

Note that, in the description above, when the number of links in the row of the mapping source model 5 is greater than or equal to the number of links in the robot link-sequence 6, the shape of the robot link-sequence 6 is uniquely determined by appropriately setting the number and positions of the plurality of positions in the link-sequence. On the other hand, when the number of links in the link-sequence of the mapping source model 5 is less than the number of links in the robot link-sequence 6, the shape of the robot link-sequence 6 may not be uniquely determined. The fact that the shape of the robot link-sequence 6 is not uniquely determined means that a plurality of different robot link-sequence information that minimizes the objective function E can be calculated. In such a case, for example, the calculation unit 15 may calculate the robot link-sequence information randomly, or may calculate the robot link-sequence information using the constraint condition for uniquely determining the robot link-sequence information. The constraint condition may be, for example, to minimize the change from the link-sequence of the immediately preceding robot 6. The change may be a change in the angle of the joint or a change in a specific position in the link-sequence. The specific position may be a joint, a tip, or any other point. Furthermore, the robot link-sequence information for reducing the objective function E may be calculated using other constraint conditions. The specific position may be a joint, a tip, or any other point. Alternatively, the robot link-sequence information for reducing the objective function E may be calculated using other constraint conditions. Even when the number of links in the link-sequence of the mapping source model 5 is greater than or equal to the number of links in the robot link-sequence 6, if the shape of the robot link-sequence 6 is not uniquely determined, the robot link-sequence information may be calculated in a similar way as the explanation above.

As described above, according to the link-sequence mapping device of the present embodiment, even if a conversion formula or the like for mapping the model link-sequence 5 to the robot link-sequence 6 is not manually created, the shape of the model link-sequence 5 can be mapped to the robot link-sequence 6 so that the robot link-sequence 6 performs an operation similar to that of the model link-sequence 5. Therefore, there is an advantage that it becomes unnecessary to prepare the conversion formula. Also, when such a conversion formula is used, conversion of the robot 6 to the link-sequence may fail due to the model 5 performing unexpected movement, and the movement of the robot 6 may stop halfway. However, such occurrence can be avoided by performing mapping in this embodiment. Further, when the number of the links of the robot 6 is smaller than the number of the links of the model 5 or when the range of motion of the joint of the robot 6 is narrower than the range of motion of the joint of the model 5, namely, even when mapping for complete mirroring cannot be performed, the movement of the robot 6 can be imitated by the movement of the model 5. Further, by disposing the noise removing unit 16, it becomes possible to remove high frequency noise in the robot link-sequence information, and it becomes possible, for example, to reduce the influence of high frequency noise mixed in the model link-sequence information.

Also, conventionally, the movement of a human being was sometimes captured so as to match the number of links of the humanoid robot and the range of motion of the joint. Specifically, when the number of links of the arm of the robot is one, the movement related to one link may only be captured also in the human arm. In such a case, it was necessary to perform the setting for each kind of the humanoid robot so that the dedicated motion capture is performed. On the other hand, in the link-sequence mapping device 1 according to the present embodiment, since the mapping from the model link-sequence information to the robot link-sequence information is automatically performed, the motion capture device 2 may be a device that performs general-purpose motion capture. Therefore, there is also a merit that it is not necessary to perform a dedicated motion capture.

Further, in the present embodiment, a case wherein the link-sequence mapping device 1 is provided with the noise removing unit 16 has been described. However, when the high frequency noise component is not removed, the apparatus may not be equipped with the noise removing unit 16. For example, when it is clear that high-frequency noise components are not included in the model link-sequence information, the link-sequence mapping device 1 may not be provided with the noise removing unit 16.

Furthermore, in the present embodiment, a case wherein a normalizing unit 13 prescribes, or may not prescribe, the base end of the model link-sequence 5 and the base end of the robot link-sequence 6 to the origin of the coordinate system, has been described. The robot link-sequence information using the objective function may be calculated in a situation that both base ends are not the origin and the coordinate system of each link-sequence may be prescribed in a way wherein both base ends become the origins from the beginning.

Further, in the present embodiment, a case wherein the length of the model link-sequence 5 and the length of the robot link-sequence 6 are normalized has been described, but this may not necessarily be the case. For example, when both lengths are set to be the same, for example, when the length of the link-sequence in the model link-sequence information and the length of the robot link-sequence 6 are determined to be the same, for example, the normalization processing may not necessarily be performed. In such a case, the link-sequence mapping device 1 may not be equipped with the normalizing unit 13.

Furthermore, in the present embodiment, a case wherein the movable range information of the joint is stored in the storage unit 12 has been described, but this case may not be always necessary. For example, when the range of motion of the joint is not limited, the joint range information may not be stored in the storage unit 12. In a case wherein the joint movement range information is not stored in the storage unit 12, the calculation unit 15 calculates the robot link-sequence information in such a way that the objective function becomes small under a situation wherein there is no restriction condition concerning the range of motion of the joint.

Also, in the present embodiment, as described above, a series of processing for calculating the robot link-sequence information using the model link-sequence information and outputting according to the robot link-sequence information thus obtained may be performed in real time, or may not.

Further, in the present embodiment, a case wherein there is no branch in the model link-sequence 5 or the robot 6 has been described, but a branch may not be included in the link-sequence. In a case where a branch is included in the model link-sequence 5 or the robot 6, at the branch point, for example, the branch point may be divided into a plurality of link-sequences, and the processing described above may be performed on each link-sequence without branching, or the process described above may be performed on the link-sequence having the branches.

Further, in the present embodiment, a case wherein mapping for causing the robot 6 to operate as a mirror robot has mainly been described, but this may not be necessary. For example, the link-sequence of the arm of the model 5 may be mapped to the link-sequence of the foot of the robot 6, and the link-sequence of the foot of the model 5 may be mapped to the link-sequence of the arm of the robot 6. Furthermore, the link-sequence of the arm of the human model 5 may be mapped to the link-sequence from the head to the tail of the snake-shaped robot 6.

Also, in the above embodiments, each process or each function may be realized by being centrally processed by a single device or a single system, or may be realized by distributed processing by a plurality of devices or by a plurality of systems.

Further, in the above-described embodiment, when two constituent elements for exchanging the information are physically different from each other, for example, the exchange of the information between each constituent may be performed by outputting of information by a constituent element and reception of information by another constituent element or when the two constituent elements for exchanging the information are physically the same, the information exchange may be performed by changing from a processing phase corresponding to one constituent element to another processing phase corresponding to another constituent element.

In the above-mentioned embodiment, information related to processing executed by each constituent element, for example, information each constituent element receives, obtains, selects, generates, calculates, transmits or receives, and also information such as thresholds, mathematical formulas and addresses used by each constituent for processing information such as threshold values, mathematical formulas, addresses and the like, may be temporarily or on a long term basis maintained in a recording media (not shown), even if being not written clearly. Also, the storage of information in the recording medium (not shown) may be performed by each component or a storage unit (not shown). Further, reading of information from the recording medium (not shown) may be performed by each component or a reading unit (not shown).

Further, in the embodiment described above, when information used in each constituent or the like, for example, information such as a threshold, an address and various kinds of settings used for processing may be changed by a user, even if not explicitly stipulated in the explanation stated above, it may be so arranged that the user can suitably change those information, or it may not. In the case wherein a user can change the information, the change may be realized, for example by a receiving unit (not shown) that receives a change instruction from the user and a changing unit (not shown) that changes information according to the change instruction. The reception of the change instruction by the receiving unit (not shown), for example, may be an reception from the input device or reception of information transmitted through a communication line or reception of information read out from the predetermined recording medium.

Further, in the above embodiment, in a case wherein two or more components included in the link-sequence mapping device 1 have a communication device and the like, two or more components may physically possess a single device, or may possess a separate device.

Further, in the above-described embodiment, each component may be configured with dedicated hardware, or a component realizable by software may be realized by executing a program. For example, each component can be realized by reading and executing of the software program recorded in a recording media such as a hard disk and a semiconductor memory. At the time of program execution, the program execution unit may execute the program while accessing the storage unit and recording medium. Note that the software for realizing the link-sequence mapping device 1 in the above mentioned embodiment is the following program. In other words, this program is a program for causing a computer to function as: a receiving unit that receives model link-sequence information that is information on the position of each link included in a model link-sequence; a specifying unit that specifies coordinate values of a plurality of predetermined positions using the model link-sequence information received by the receiving unit; a calculation unit that calculates the robot link-sequence information which is information regarding the position of each link included in the link-sequence information of the robot so that the corresponding objective function becomes small and an output unit that outputs information regarding the angle of each joint of the robot link-sequence corresponding to the robot link-sequence information.

In the above program, the functions realized by the program mentioned above do not include functions that can be realized only by hardware. For example, an acquiring unit for acquiring information and a function that can be realized only by hardware such as a modem or an interface card are not included at least in the function for realizing the above mentioned program.

Further, this program may be executed by being downloaded from a server or the like, and also may be executed by reading out a program recorded in a predetermined recording medium (for example, an optical disk such as a CD-ROM, magnetic disk, a semiconductor memory, etc.). Also, this program may be used as a program constituting a program, product.

Further, the computer that executes this program may be a single computer or a plurality of computers. In other words, centralized processing may be performed or distributed processing may be performed.

Figure 8:
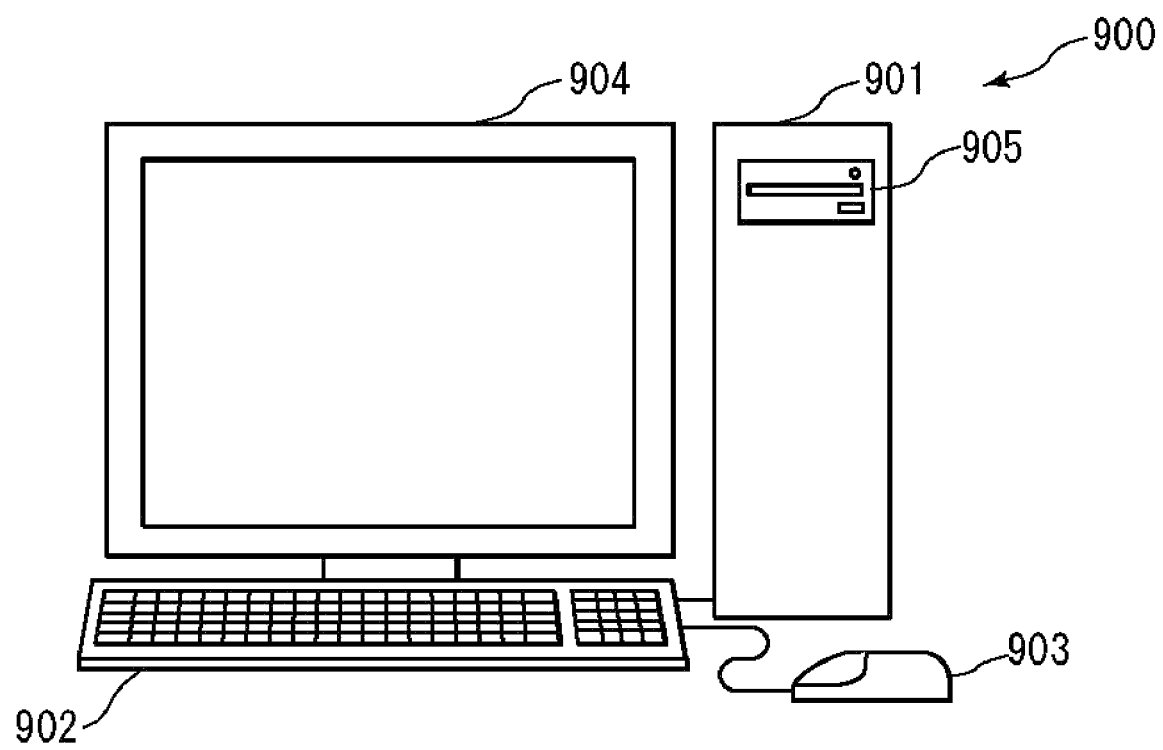
FIG. 8 is a schematic diagram showing an example of an appearance of a computer system in the same embodiment.

FIG. 8 represents a schematic diagram showing an example of the external appearance of a computer that executes the program and realizes the link-sequence mapping device 1 of the above embodiment. The above embodiment can be realized by computer hardware and a computer program executed on the computer hardware.

In FIG. 8, the computer system 900 includes a computer 901 with a CD-ROM drive 905, a keyboard 902, a mouse 903, and a monitor 904 being disposed.

Figure 9:
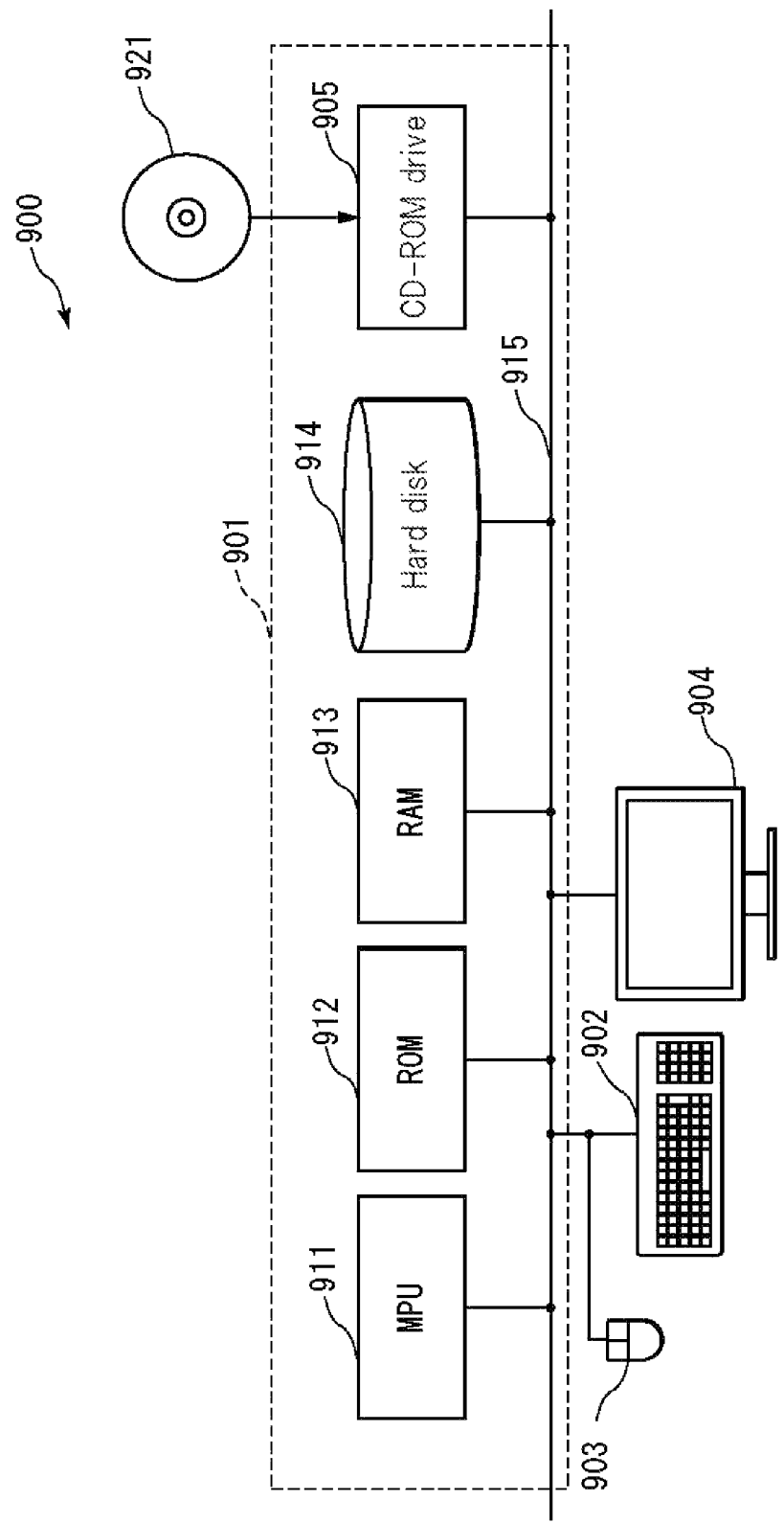
FIG. 9 is a diagram showing an example of a configuration of a computer system in the same embodiment.

FIG. 9 is a diagram showing the internal configuration of the computer system 900. In the FIG. 9, the computer 901 includes, in addition to the CD-ROM drive 905, an MPU (Micro Processing Unit) 911, a ROM 912 for storing a program such as a boot-up program and the like, being connected to the MPU 911, to temporarily store instructions of the application program, a RAM 913 that provides a temporary storage space, a hard disk 914 that stores application programs, system programs and data, and a bus 915 that mutually connects the MPU 911, the ROM 912 and the like. Note that the computer 901 may include a network card (not shown) that provides connections to a LAN, a WAN, or the like.

A program that causes the computer system 900 to execute the functions of the link-sequence mapping device 1 of the embodiment mentioned above may be stored in the CD-ROM 921, inserted into the CD-ROM drive 905, and transferred to the hard disk 914. Alternatively, the program may be transmitted to the computer 901 via a network (not shown) and stored in the hard disk 914. The program is loaded into the RAM 913 at the time of execution. It should be noted that the program may be loaded directly from the CD-ROM 921 or the network. Further, in place of the CD-ROM 921, the program may be read into the computer system 900 via another recording medium (for example, DVD or the like).

The program may not necessarily include an operating system (OS), a third party program, or the like that causes the computer 901 to execute the functions of the link-sequence mapping device 1 of the above embodiment. The program may include only the portions of the instructions that command appropriate functions and modules in a controlled manner to obtain the desired results. It is well known how the computer system 900 operates, and a detailed description thereof is omitted.

Also, the present invention is not limited to the above-described embodiments, and various modifications are possible, and it goes without saying that they are also included within the scope of the present invention.

INDUSTRIAL APPLICABILITY

According to the link-sequence mapping device and the like of the present invention, it is possible to automatically map the model link-sequence to a link-sequence of an arbitrary robot, and for example, it is useful as an apparatus for operating a humanoid robot or the like as a mirror robot or the like.

DESCRIPTION OF SYMBOLS

1. Link-sequence mapping device
2. Motion capture device
5. Model
6. Robot
11. Reception unit (also referred to as "receiving unit")
12. Storage unit
13. Normalization unit (also referred to as "normalizing unit")
14. Identification unit (also referred to as "specification unit" or "specifying unit")
15. Calculation unit (also referred to as "calculating unit")
16. Noise removal unit (also referred to as "noise removing unit" or "noise elimination unit")
17. Output unit

What is claimed is:
1. A link-sequence mapped robotic system, comprising:
a robot having a robot body comprising a robot link-sequence, the robot link-sequence including a plurality of robot links attached at a plurality of robot joints, each robot joint attaching two robot links to one another, each robot joint having a range of motion, each robot link having a length;

a mapping device configured with model link-sequence information regarding a model link-sequence of a model having a model body, the model link-sequence including a plurality of model links attached at a plurality of model joints, each model joint attaching two model links to one another, each model joint having a range of motion, each model link having a length, the model link-sequence information regarding a position of each model link;

the robot link-sequence differing from the model link-sequence in at least one of the following: a joint range of motion, a number of links, a number of joints, a ratio of lengths of links mapped to one another, a link-sequence role within a body;

a link-sequence mapping device comprising a hardware micro processing unit and software which upon execution with the hardware micro processing unit specifies coordinate values of a plurality of predetermined link-sequences using the model link-sequence information, calculates robot link-sequence information regarding a position of each robot link for an objective function to become smaller corresponding to each distance between a plurality of model link-sequence places and a plurality of robot link-sequence places, and positions the robot links and robot joints based on the calculated robot link-sequence information.

2. The link-sequence mapped robotic system of claim 1, wherein a number of said plurality of specified places is larger than a number of connection points at a link-sequence of said robot.

3. The link-sequence mapped robotic system of claim 1, further comprising:
a storage unit configured by storing joint movable range information of a joint at a link-sequence of said robot; and
wherein said mapped robotic system is configured to make said objective function small in a movable region defined by said joint movable range.

4. The mapped robotic system of claim 1, further configured to
normalize a link-sequence length of said model, said distance being a distance after normalization.

5. The mapped robotic system of claim 1, wherein said distance corresponds to a coordinate value in a coordinate system making a base end of a link-sequence of said model and a base end of a link-sequence of said robot an origin point.

6. The mapped robotic system of claim 1, further configured to eliminate a high frequency noise element included in said robot link-sequence information.

7. A robot link-sequence mapping system, comprising:
a communication line to a robot; and
a computer having a processor and storage space in operable communication with the processor, the storage space configured by containing a software program which upon execution with the processor performs a method for mapping a link-sequence of a model to the robot, the method comprising:
receiving model link-sequence information regarding a position of links included in the model link-sequence,
specifying coordinate values of a plurality of predetermined link-sequences of said model,
calculating robot link-sequence information regarding a position of each link included in a link-sequence of said robot for an objective function to become smaller, the objective function corresponding to distances between a plurality of specified coordinate values and a respective plurality of places at a robot link-sequence, and
outputting to the communication line information regarding an angle of each joint in a link-sequence of said robot corresponding to said calculated robot link-sequence information.

8. The robot link-sequence mapping system of claim 7, wherein the communication line to the robot comprises a wireless communication line.

9. The robot link-sequence mapping system of claim 7, wherein the software program includes instructions which upon execution with the processor specifies coordinate values according to equations of the following form:

$$\sum_{i=0}^{j-1} d_i \le g_i < \sum_{i=0}^{j} d_i \quad (1)$$

$$\frac{g_i - \sum_{i=0}^{j-1} d_i}{d_j} \quad (2)$$

where $g_i$ represents a length from a base end side, and $d_i$ represents a length of a link.

10. The robot link-sequence mapping system of claim 7, wherein the when the number of links in a row of a mapping source model is greater than or equal to the number of links in the robot link-sequence, and a shape of the robot link-sequence is uniquely determined by setting the number and positions of the plurality of positions in the link-sequence.

11. The robot link-sequence mapping system of claim 7, wherein the when the number of links in a row of a mapping source model is less than the number of links in the robot link-sequence, and a shape of the robot link-sequence is uniquely determined using a constraint condition, and the constraint condition minimizes a change in a preceding robot position or angle.

12. A link-sequence mapping method, comprising:
receiving model link-sequence information regarding link positions in a link-sequence of a model of a robot;
specifying coordinate values of a plurality of predetermined link-sequences of said model using at least a portion of the model link-sequence information received;
calculating robot link-sequence information regarding a position of each link included in a link-sequence of said robot for an objective function to become smaller, the objective function corresponding to each distance between a plurality of places specified by said specifying step and a plurality of places at a robot link-sequence; and
controlling the robot at least in part by outputting information regarding an angle of each joint in a link-sequence of said robot corresponding to robot link-sequence information calculated by said calculating step.

13. The link-sequence mapping method of claim 12, wherein making said objective function smaller comprises making the distance smaller in a movable region shown by a joint movable range.

14. The link-sequence mapping method of claim 12, further comprising normalizing a link-sequence length of said model.

15. The link-sequence mapping method of claim 12, further comprising making a base end of a link-sequence of said model and a base end of a link-sequence of said robot an origin point.

16. The link-sequence mapping method of claim 12, further comprising eliminating a high frequency noise element included in said robot link-sequence information.

17. The link-sequence mapping method of claim 12, wherein the mapping method is performed in real time.

18. The link-sequence mapping method of claim 12, wherein the outputting step repeats the information along a time series at one or more intervals.

19. The link-sequence mapping method of claim 12, wherein the receiving step receives motion capture data in real time.

20. The link-sequence mapping method of claim 12, wherein the method maps movement of a human being model to movement of a humanoid robot.

* * * * *